United States Patent
Heckerman et al.

(10) Patent No.: US 7,409,371 B1
(45) Date of Patent: Aug. 5, 2008

(54) EFFICIENT DETERMINATION OF SAMPLE SIZE TO FACILITATE BUILDING A STATISTICAL MODEL

(75) Inventors: David E. Heckerman, Bellevue, WA (US); Christopher A. Meek, Kirkland, WA (US); Bo Thiesson, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 933 days.

(21) Appl. No.: 09/873,719

(22) Filed: Jun. 4, 2001

(51) Int. Cl.
*G06N 5/00* (2006.01)

(52) U.S. Cl. .......................... 706/12; 706/45

(58) Field of Classification Search ............... 706/12, 706/13, 20, 45
See application file for complete search history.

(56) References Cited

U.S. PATENT DOCUMENTS

| | | | |
|---|---|---|---|
| 5,140,530 A * | 8/1992 | Guha et al. | 706/13 |
| 6,047,277 A * | 4/2000 | Parry et al. | 706/20 |
| 6,272,479 B1 * | 8/2001 | Farry et al. | 706/13 |
| 6,768,982 B1 * | 7/2004 | Collins et al. | 706/45 |

OTHER PUBLICATIONS

Microsoft Press Computer Dictionary: Third Edition, The Microsoft Press, 1997, p. 20.*

Leung, Y., et al., "A New Method for Mining Regression Classes in Large Data Sets", *IEEE Transactions on Pattern Analysis and Machine Intelligence*, vol. 23, No. 1, 2001, p. 5-21.

Ozelkan EC (Reprint), et al.; "Multi-Objective Fuzzy Regression: A General Framework", *Computers & Operations Research*, vol. 27, No. 7-8, 2000, p. 635-652.

Yilmaz, A., et al.; "Input Data Analysis Using Neural Networks", *Simulation*, vol. 74, No. 3, 2000, p. 128-137.

Meek, C., et al.; "The Learning Curve Method Applied to Clustering", *Technical Report*, Jul. 2000, p. 1-4.

Meek, C., et al.; "The Learning Curve Method Applied to Clustering", *Technical Report MSR-TR-01-34*, Feb. 2001, p. 1-19.

Peter Cheeseman and John Stutz, Bayesian Classification (AutoClass): Theory and Results, Advances in Knowledge Discovery and Data Mining, 1995, pp. 153-180, AAAI Press, Menlo Park, CA.

Ronald A. Howard, Decision Analysis: Applied Decision Theory, Proceedings of the Fourth International Conference on Operational Research, 1966, pp. 55-71, Wiley-Interscience.

(Continued)

*Primary Examiner*—Wilbert L Starks, Jr.
(74) *Attorney, Agent, or Firm*—Amin, Turocy & Calvin, LLP

(57) ABSTRACT

A model is constructed for an initial subset of the data using a first parameter estimation algorithm. The model may be evaluated, for example, by applying the model to a holdout data set of the data. If the model is not acceptable, additional data is added to the data subset and the first parameter estimation algorithm is repeated for the aggregate data subset. An appropriate subset of the data exists when the first parameter estimation algorithm produces an acceptable model. The appropriate subset of the data may then be employed by a second parameter estimation algorithm, which may be a more accurate version of the first algorithm or a different algorithm altogether, to build a statistical model to characterize the data.

58 Claims, 5 Drawing Sheets

OTHER PUBLICATIONS

George H. John and Pat Langley, Static Versus Dynamic Sampling for Data Mining, Proceedings of the Second International Conference on Knowledge Discovery and Data Mining, 1996, pp. 367-370, AAAI/MIT Press.

Carl Myers Kadie, Seer: Maximum Likelihood Regression For Learning-Speed Curves, Thesis, 1995, 104 pages, Department of Computer Science, University of Illinois, Urbana, IL.

D. Pearce, Cost Benefit Analysis, 1983, pp. 59-89, St. Martin's Press, New York.

Foster Provost, David Jensen, and Tim Oates, Efficient Progressive Sampling, Conference on Knowledge Discovery in Data, Proceedings of the Fifth ACM SIGKDD International Conference on Knowledge Discovery And Data Mining, 1999, pp. 23-32 pages, ACM, New York.

B. Thiesson, C. Meek, D.M. Chickering, and D. Heckerman, Computationally Efficient Methods for Selecting Among Mixtures of Graphical Models, Bayesian Statistics 6: Proceedings of Sixth Valcenia International Meeting, 1999, pp. 631-656, Clarendon Press, Oxford.

* cited by examiner

EFFICIENT DETERMINATION OF SAMPLE SIZE TO FACILITATE BUILDING A STATISTICAL MODEL

TECHNICAL FIELD

The present invention relates to computer programming and, more particularly, the present invention relates to a system and method to facilitate building a model to characterize data based on a subset of the data having an appropriate size.

BACKGROUND

In situations where one has access to massive amounts of data, the cost of building a statistical model to characterize the data can be significant if not insurmountable. The accuracy of the model and the cost of building the model are competing interests associated with building a statistical model. That is, while the use of a larger data set may provide a more accurate model than a smaller set of the data, the analysis of data tends to become increasingly inefficient and expensive with larger data sets. Because of the computational complexity associated with analyzing large data sets, a common practice is to build a model on the basis of a sample of the data. However, the choice of the size of the sample to use is far from clear.

Various methodologies have been proposed to employ progressive samples to analyze data in order to find an adequate sample size for which a model of reasonable quality can be constructed. A learning curve method (also known as progressive sampling) is one approach to evaluate the relationship between the accuracy of a model and the cost of learning the model. The basic idea of a learning curve method is to iteratively apply a learning method to larger and larger subsets of the data until the increasing costs of learning from larger subsets outweigh the increasing benefit of accuracy. FIG. 1 illustrates a typical learning curve, illustrating the relationship between benefit and cost. As shown in FIG. 1, the learning curve has a steeply sloping portion early in the curve, a more gently sloping middle portion, and a plateau late in the curve.

There are three main components of a learning curve method. The first component is the data policy, which is the sampling schedule by which one uses portions of the data set to train a model. The second component is the training policy (or induction algorithm), which defines how one applies a training method to the data. The final component is the stopping criterion, which is how one determines that the cost associated with further training exceeds the benefit of improved performance.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides a system and method to facilitate building a statistical model that characterizes data. A crude model is constructed for an initial subset of the data using a first parameter estimation algorithm. The model may be evaluated, for example, by applying the model relative to a holdout data set of the data. If the model is not acceptable, additional data is added to the data subset and the first parameter estimation algorithm is repeated for the aggregate data subset. An appropriate subset of the data exists when the first parameter estimation algorithm produces an acceptable model. The appropriate subset of the data may then be employed by a different parameter estimation algorithm to build a statistical model to more accurately characterize the data.

According to an aspect of the present invention, the invention provides a relatively fast determination of an adequate size for the training data in situations where parameters will be estimated by employing a known parameter estimation technique. By way of example, an iterative parameter estimation technique, such as an Expectation Maximization (EM) algorithm, may be utilized in practicing the present invention. It does so by applying a generally crude version of the parameter estimation algorithm. By way of illustration, each iterative estimation process may utilize a fixed number of iterations (e.g., one or more iteration). Alternatively, each iterative estimation process may continue until a predetermined convergence criterion (e.g., a relatively high threshold) is satisfied.

After the parameters have been estimated by the crude version of the algorithm, the estimated parameters are evaluated by applying the model for which these parameters are estimated to the holdout data set. If the performance of the model as applied to the holdout data set is determined to be acceptable, the data subset that was employed to determine the model parameters defines the desired data subset. The desired data subset may then be utilized to continue the iterative estimation process of the model parameters until an acceptable level of convergence is achieved. If the performance on the holdout data set is not acceptable, however, the crude parameter estimation and evaluation process may be repeated for each successively larger subset of the training data set until the performance is determined to be acceptable.

In accordance with an aspect of the present invention, each estimation process associated with determining a desired data subset of the training data set may utilize estimated parameters from an estimation process computed for a previous smaller subset of the training data.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DESCRIPTION OF THE INVENTION

The present invention provides a system and method to facilitate building a statistical model to characterize a data set based on an appropriately sized subset of the data. A crude model is constructed for an initial subset of the data using a first parameter estimation algorithm. If the model is determined to be unacceptable, additional data is added to the data subset and the first parameter estimation algorithm is repeated for the aggregate subset of data. An appropriate subset of the data exists when the first parameter estimation algorithm produces an acceptable model. The appropriate subset of the data may be employed by a more accurate parameter estimation algorithm to build a statistical model to characterize the data.

Figure 2:
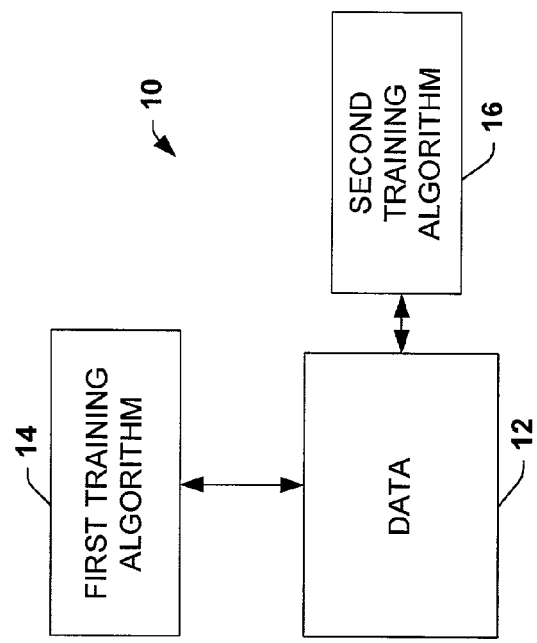
FIG. 2 is an example of a system to facilitate modeling in accordance with the present invention.
Figure 1:
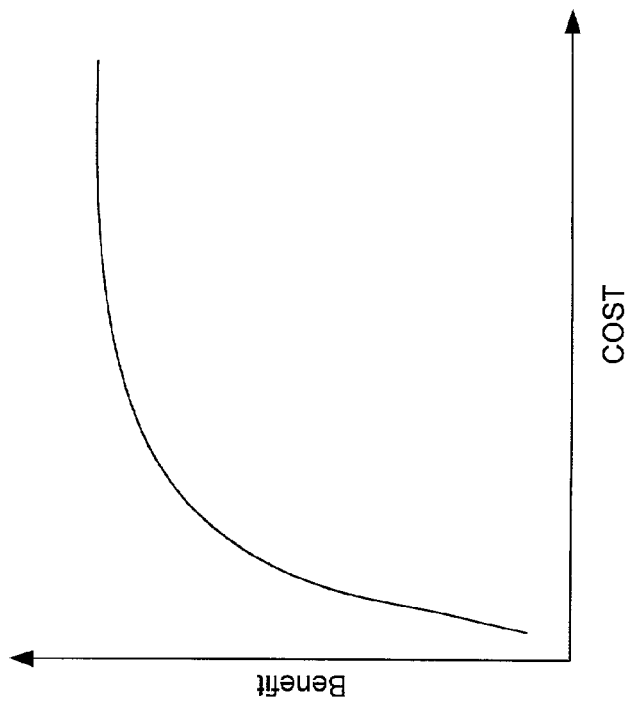
FIG. 1 is an example of a typical learning curve.

Turning to FIG. 2, a system 10 to facilitate building a model to characterize a data set 12 in accordance with an aspect of the present invention is illustrated. The data set 12 may be divided into a training data set and a holdout data set. The model is constructed from the training set and the holdout set is utilized to evaluate the efficacy of the model.

The system 10 also includes a first training algorithm 14 that is programmed and/or configured to construct a model that characterizes a subset of data from the data set 12. The training algorithm 14 may employ any known parameter estimation technique or induction method that is operable to derive a model that characterizes a given subset of the data set. Any data policy, such as adding a fixed or geometrically increasing number of cases may be utilized to choose the data subset at each stage of processing. A data policy which adaptively selects the number of cases in the data subset at each stage of processing can also be used in accordance with an aspect of the present invention.

The training algorithm 14 employs a training policy to compute a model for a subset of the training data 12. In accordance with an aspect of the present invention, the training algorithm 14 is a computationally efficient algorithm programmed and/or configured to efficiently model the data subset (e.g., it may construct a generally crude model). By way of example, the training algorithm 14 may include an iterative method, such as the Expectation Maximization (EM) algorithm. One or more aspects of the training algorithm 14 may be controlled to improve scalability and reduce the amount of time needed to identify an appropriate data set that may be utilized to train a model. For an example of an iterative training algorithm, the number of iterations may be controlled (e.g., by employing a fixed number of iterations or a high convergence threshold). Additionally or alternatively, parameter estimates from a previous stage of processing may be utilized to initialize the training algorithm 14 in a subsequent processing stage.

The model created by the first training algorithm 14 for each data subset may be evaluated to determine whether it is acceptable, such as based on a defined stopping criterion. If the model is not acceptable, additional data from the training set 14 may be added to the previous subset according to the data policy. In this way, increasingly larger data subsets are modeled and evaluated until the model is determined to be acceptable, such as based on evaluating improvements in the model.

A second training algorithm 16 operative to train a statistical model may then use the aggregate data subset, which enabled the first training algorithm 14 to provide the acceptable model. The second training algorithm 16, which is different from the first training algorithm 14, determines model parameters that characterize the subset of data. For example, the second algorithm may be more complex than the first algorithm 14 so as to be capable of more accurately modeling the data than the first training algorithm. That is, the first training algorithm 14 is utilized to rapidly determine an appropriate subset of the training data and the second training algorithm 16 employs the determined subset to build a substantially accurate statistical model. As a result of expeditiously choosing a sample set of the data, the overall efficiency of the learning curve method is improved. It is to be understood and appreciated that the approach described with respect to the system 10 may be utilized by any training algorithm (e.g., parameter estimation technique) to efficiently build a statistical model.

Figure 3:
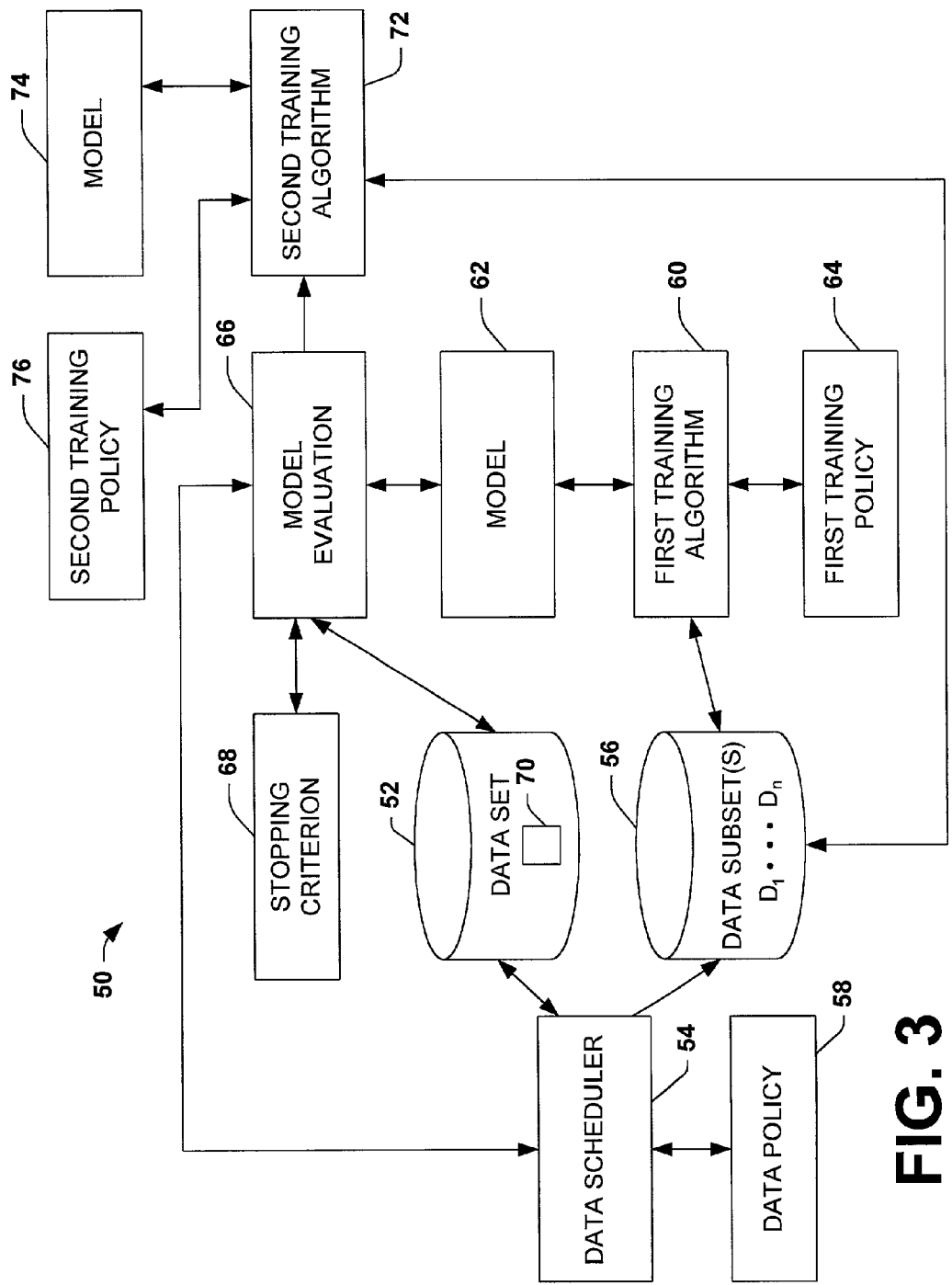
FIG. 3 is an example of a system to facilitate modeling in accordance with the present invention.

FIG. 3 illustrates an example of a system 50 to efficiently determine an adequate sample size and facilitate building a statistical model in accordance with an aspect of the present invention. The system 50 includes a large data set 52 having a plurality of data records. A data scheduler 54 chooses a subset 56 of a training portion of the data set 52 for processing based on a defined data policy 58.

The data policy 58 may be a fixed policy, such as an incremental schedule or a geometric schedule. An incremental schedule adds a fixed number of data points. In contrast, a geometric schedule adds a geometrically increasing number of data points, which facilitates reaching an appropriate number of data points for the data subset 56. Alternatively, the data policy 58 may employ an adaptive approach to choose a number of data points for the subset 56, which may be employed in a modeling portion of the system 50. Those skilled in the art will understand and appreciate other data policies that could be utilized to select data points, all of which are contemplated as falling within the scope of the present invention. The data scheduler 54 is operative to provide successively larger data subsets 56, which may be represented as subsets $D_1, \ldots, D_n$, where $D_i$ is a subset of $D_j$ if $i<j$.

The system 50 includes a first training algorithm 60 that is programmed and/or configured to build a model 62 according to the data subset 56 in accordance with an aspect of the present invention. The training algorithm 60, for example, is a computationally efficient algorithm operative to build a model 62 that characterizes the data subset 56 based on an associated training policy 64. The training algorithm 60, for example, trains the model 62 based on a subset of data, denoted $D_i$, which model may be represented by the parameterization $\theta(D_i)$.

According to an aspect of the present invention, the training policy 64 of the training algorithm 60 is selected to expedite processing time. The training policy 64 controls how the training algorithm 60 builds a model for each subset of data 56. For example, the training policy 64 may include a convergence criterion that defines when an iterative training algorithm should stop training for a particular subset 56 of the data 52. As described below, the training policy may establish a convergence criterion that limits the algorithm 60 to a fixed number of iterations or establish a convergence threshold to which the algorithm may be run for each data subset 56.

Additionally or alternatively, the training policy 64 may control parameter initialization of the first algorithm 60 for each data subset 56. For example, the training algorithm for each data subset 56 being modeled by the training algorithm 60 may be initialized by the same random or predetermined parameterization. Alternatively, in accordance with an aspect of the present invention, parameter values $\theta(D_{n-1})$ obtained from a previous application of the training algorithm 60 to a corresponding data subset $D_{n-1}$ may be utilized to initialize the training algorithm for the next data subset $D_n$.

In accordance with another aspect of the present invention, where the construction of a cluster model is intended, the parameters associated with cluster weights may be set uniformly for each application of the training algorithm 60. It is to be appreciated that some clusters may coalesce after applying the training algorithm 60 to small data subsets due to a lack of data to support these clusters. To alleviate premature cluster starvation, clusters that have coalesced may be identified and their respective cluster parameterization be reset to the initial random or predetermined cluster parameterization.

By way of illustration, the training algorithm 60 may implement an iterative parameter estimation technique, such as the EM algorithm, according to its associated training policy 64. Each iteration in the EM algorithm consists of an expectation step (or E step) and a maximization step (or M step). For each iteration, the algorithm gradually improves the parameterization until convergence. The training algorithm 60 may perform as many EM iterations as necessary according to the training policy. For additional details concerning the EM algorithm, reference may be made to Dempster et al., Maximum Likelihood from Incomplete Data via the EM Algorithm, Journal of the Royal Statistical Society, Series B, 39, 1-38 (1977).

For an iterative training algorithm 60 implemented in accordance with an aspect of the present invention, the training policy 64 controls the iterative process. For example, to expedite processing, the EM algorithm may be run for a fixed number of iterations (e.g., one or more). In accordance with a particular aspect, a single iteration may be employed to efficiently determine a suitable number of data points. By carefully choosing the training policy 64 for the training algorithm 60 it is possible to gain significant increases in performance. That is, one can significantly reduce the amount of time needed for identifying a number of data points needed to adequately train a model by implementing a training policy that provides a computationally efficient training algorithm 60 in accordance with an aspect of the present invention.

In accordance with another aspect of the present invention, the training policy 64 may establish a convergence threshold for the training algorithm 60. For instance, the training policy 64 may control the training algorithm 60 to run until a predetermined convergence criterion (e.g., a threshold) is satisfied. By way of example, where the training algorithm 60 is implemented as the EM algorithm, the convergence criterion provided by the training policy 64 may provide for running the training algorithm to a high convergence threshold (e.g., to about $10^{-2}$, if $10^{-5}$ would be considered as a good convergence threshold for the algorithm). A lower convergence threshold typically results in more accurate estimated parameters, but requires additional computation time to obtain such results. Thus, the modeling performed by the first training algorithm 60 is designed, in accordance with an aspect of the present invention, to forsake some accuracy for computational efficiency.

A model evaluation function 66 is employed to evaluate whether the model 62 determined by the training algorithm 60 is acceptable. The evaluation function 66 may employ a stopping criterion 68 to evaluate the tradeoff between the expected incremental cost of additional training and the expected incremental benefit of increasing the size of the considered data subset by going from subset $D_n$ to subset $D_{n+1}$. The stopping criterion, which may be expressed as the ratio of expected incremental benefit over expected incremental cost, could terminate the search for the appropriate number of data points, when the ratio drops below a stopping threshold, indicated as $\lambda$ (Eq. 1).

$$\frac{\Delta \text{Benefit}}{\Delta \text{Cost}} < \lambda \qquad \text{Eq. 1}$$

By way of illustration, performance of a model can be evaluated in terms of a log likelihood for the model $\theta$ for data subset $D_n$ on holdout data, e.g., $l(D_{HO}|\theta(D_n))$. The holdout data may be obtained by splitting the initial data set 52 into a training set (from which each data subset 56 is derived) and a holdout set 70. It may be desirable to measure the expected incremental benefit of additional training as the relative improvement in performance on the holdout set between most recent successive data sets (determined by the data policy) with respect to total improvement over a base model $\theta_{BASE}$ ($D_1$). By way of example, the expected incremental benefit associated with the model $\theta$ may be approximated as $$\Delta \text{Benefit} = \left( \frac{l(D_{HO}|\theta(D_n)) - l(D_{HO}|\theta(D_{n-1}))}{l(D_{HO}|\theta(D_n)) - l(D_{HO}|\theta_{BASE}(D_1))} \right) \qquad \text{Eq. 2}$$

For a clustering model, for example, the base model could be a model representing only one cluster with all features mutually independent.

The expected incremental cost could be measured as the additional time it is expected to take to train and evaluate the performance of a model for the next data set, $D_{n+1}$. Alternatively or additionally, the convergence criterion could be functionally related to the incremental cost associated with an increase in the sample of size of the a data subset.

In accordance with another aspect of the present invention, an approximation for the expected incremental cost may be obtained for the EM algorithm, as $$\Delta \text{Cost} = c_1(I_1 - \bar{J}_n)|\Delta D_{n+1}| + c_2(I_1 - \bar{J}_n) + c_1 \bar{J}_n |D_{n+1}| + c_2 \bar{J}_n + c_3 \qquad \text{Eq. 3}$$

where $c_1$, $c_2$, and $c_3$ are constants, $I_1$ is the number of times the EM algorithm iterates for the second training algorithm 72, when applied to the first data subset $D_1$ considered by the data policy, $$\bar{J}_n = \frac{1}{n} \sum_{i=1}^{n} J_i,$$

and $J_i$ is the number of times the EM algorithm iterates for the first training algorithm 60 when applied to data set $D_i$, $|D_{n+1}|$ is the size of data set $D_{n+1}$, $|\Delta D_{n+1}|$ is the increment in size $|D_{n+1}| - |D_n|$.

The first and second terms correspond to an estimate for the additional time the EM algorithm would spend in the E and M steps, respectively, to reach convergence by the second training algorithm 72, when using subset $D_{n+1}$ as opposed to subset $D_n$. The third and fourth terms correspond to an estimate of the time the first training algorithm 60 would spend in the E and M steps, respectively, when using subset $D_{n+1}$. The fifth term corresponds to the time it would take to evaluate the performance of the model 62 obtained by the first training algorithm for data subset $D_{n+1}$. The constants $c_1$, $c_2$, and $C_3$ are known once a model for the initial subset $D_1$ has been built and the performance evaluated. In this case, by substituting Eqs. 2 and 3 into Eq. 1, the stopping criterion 68 becomes $$\frac{\left(\frac{l(D_{HO}|\theta(D_n)) - l(D_{HO}|\theta(D_{n-1}))}{l(D_{HO}|\theta(D_n)) - l(D_{HO}|\theta_{BASE}(D_n))}\right)}{c_1(I_1 - \overline{J}_n)|\Delta D_{n+1}| + c_2(I_1 - \overline{J}_n) + c_1\overline{J}_n|D_{n+1}| + c_2\overline{J}_n + c_3} < \lambda \quad \text{Eq. 4}$$

A slight variation of the stopping criterion 68, as expressed in Eq. 4, can offset the log likelihoods obtained for the models 62 trained by the first training algorithm 60 with the difference in log likelihoods for the models obtained by the second and first training algorithms, respectively, when applied to the first subset $D_1$. Denoting this offset by $\delta$, the stopping criterion becomes $$\frac{\left(\frac{l(D_{HO}|\theta(D_n)) - l(D_{HO}|\theta(D_{n-1}))}{l(D_{HO}|\theta(D_n)) + \delta - l(D_{HO}|\theta_{BASE}(D_n))}\right)}{c_1(I_1 - \overline{J}_n)|\Delta D_{n+1}| + c_2(I_1 - \overline{J}_n) + c_1\overline{J}_n|D_{n+1}| + c_2\overline{J}_n + c_3} < \lambda \quad \text{Eq. 5}$$

It is to be appreciated that alternative stopping criteria also could be used in the model evaluation function 66. For example, alternative criteria are described in a paper by John, G., and Langley, P., which is entitled *Static Versus Dynamic Sampling for Data Mining* and was published at Proceedings of the Second International Conference on Knowledge Discovery and Data Mining, pp. 367-370, AAAI Press (1996). Still other possible criteria are described in a paper by Provost, F., Jensen, D., and Oates, T, which is entitled *Efficient progressive sampling* and was published in Proceedings of the Fifth International Conference on Knowledge Discovery and Data Mining, pp. 23-32, ACM (1999). The foregoing publications are incorporated herein by reference.

The model evaluation function 66 is associated with the data scheduler 54 for indicating whether or not the estimated model parameters 62 are acceptable, such as based on the stopping threshold $\lambda$. The scheduler 54 is programmed to increase the size of the data subset 56 if the model trained by the training algorithm 60 is unacceptable. As mentioned above, the increase in size of the data subset 56 depends on the data policy 58 of the scheduler 54. The training algorithm 60 employs the aggregate data subset 56, which may include the previous data subset(s) and the additional data to, in turn, train the model 62 based on the established training policy 64. This process may be repeated until the parameter evaluation function 66 finds acceptable estimated parameters 62 (e.g., an acceptable model quality is established).

In accordance with an aspect of the present invention, a second training algorithm 72 trains a statistical model 74 using the aggregate data subset 56 having an appropriate number of data points, such as the data set that was previously determined to provide an acceptable model. It is to be appreciated that another subset of the data set 52 having a size that approximates the size of the determined aggregate data subset 56 also could be utilized by the second training algorithm 72 to build the statistical model 74 in accordance with an aspect of the present invention.

The training algorithm 72 is programmed and/or configured to build the model 74 according to its associated training policy 76. The training policy 76 controls operation of the training algorithm to build a more accurate model 74 than the model 62 constructed by the first training algorithm 60. For example, the training algorithm 72 itself may be a more complex algorithm and/or its training policy 76 may cause the training algorithm to utilize a lower convergence threshold than the first algorithm 60. That is, if the first and second training algorithms 60 and 72, respectively, are iterative algorithms (e.g., EM algorithms), the first training algorithm 60 may be run for a fixed number of iterations (e.g., one or more) according to its training policy 64, whereas the second training algorithm 68 may run for a greater number of iterations or to completion as defined by its training policy 74.

Those skilled in the art will understand and appreciate that the first and second training algorithms 60 and 72, respectively, may employ essentially the same or different algorithms, provided that the second algorithm is programmed and/or configured to more accurately parameterize the data. In this way, the learning curve method employing the first algorithm 60 is able to rapidly identify an appropriate number of data points. The second algorithm 72, in turn, employs a data subset having the appropriate number of data points to train a statistical model having a desired level of accuracy. As a result, the overall modeling process may be expedited due to the efficient determination of an acceptable subset of data on which the second training algorithm 72 may operate.

Figure 4:
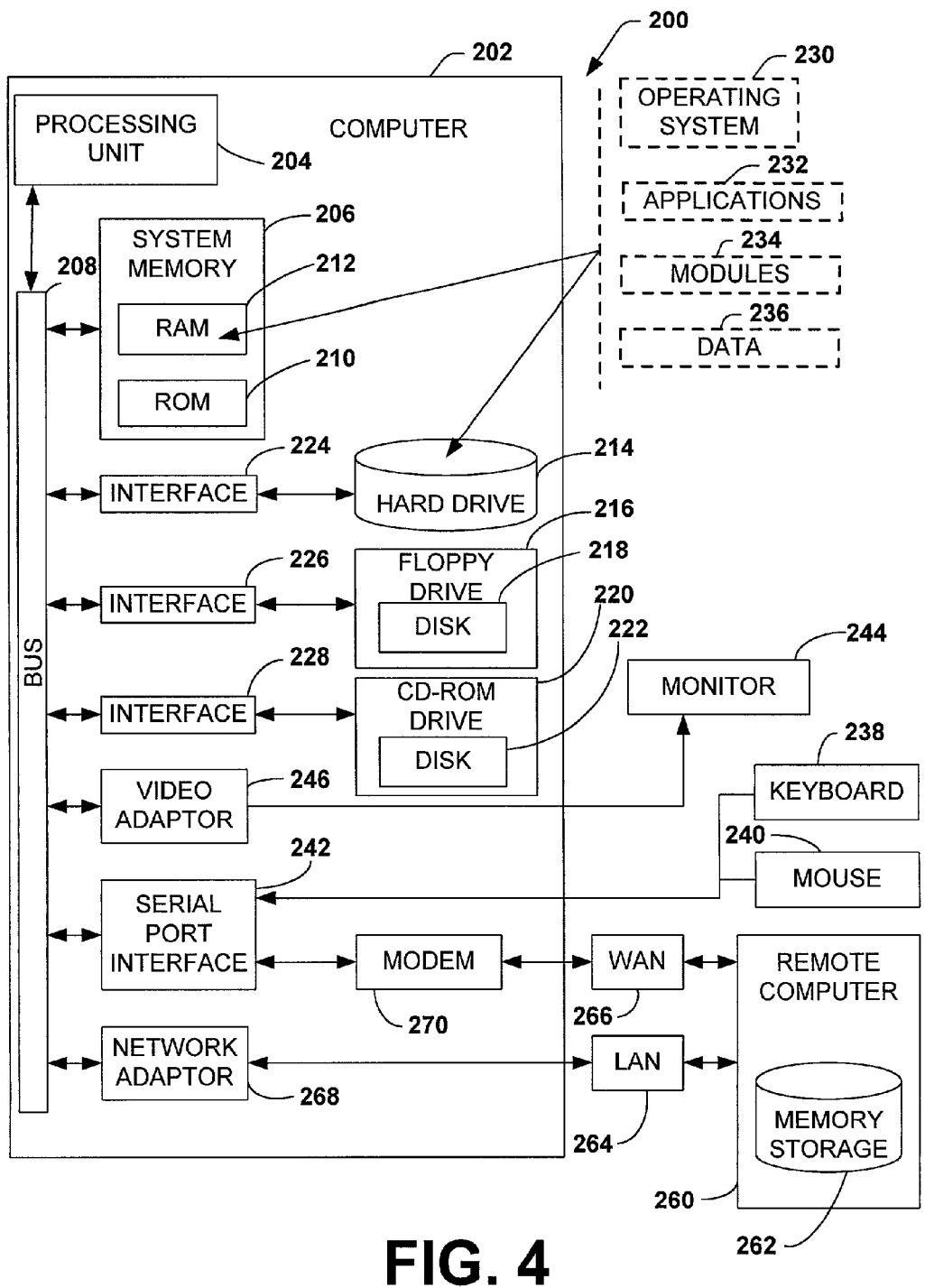
FIG. 4 is an example of an operating environment for a system implemented in accordance with the present invention.

In order to provide additional context for the various aspects of the present invention, FIG. 4 and the following discussion are intended to provide a brief, general description of a suitable computing environment 200 in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component.

With reference to FIG. 4, an exemplary system environment 200 for implementing the various aspects of the invention includes a conventional computer 202, including a processing unit 204, a system memory 206, and a system bus 208 that couples various system components including the system memory to the processing unit 204. The processing unit 204 may be any commercially available or proprietary processor. In addition, the processing unit may be implemented as multi-processor formed of more than one processor, such as may be connected in parallel.

The system bus 208 may be any of several types of bus structure including a memory bus or memory controller, a peripheral bus, and a local bus using any of a variety of conventional bus architectures such as PCI, VESA, Microchannel, ISA, and EISA, to name a few. The system 200 memory includes read only memory (ROM) 210 and random access memory (RAM) 212. A basic input/output system (BIOS), containing the basic routines that help to transfer information between elements within the computer 202, such as during start-up, is stored in ROM 210.

The computer 202 also may include, for example, a hard disk drive 214, a magnetic disk drive 216, e.g., to read from or write to a removable disk 218, and an optical disk drive 220, e.g., for reading from or writing to a CD-ROM disk 222 or other optical media. The hard disk drive 214, magnetic disk drive 216, and optical disk drive 220 are connected to the system bus 208 by a hard disk drive interface 224, a magnetic disk drive interface 226, and an optical drive interface 228, respectively. The drives and their associated computer-readable media provide nonvolatile storage of data, data structures, computer-executable instructions, etc. for the computer 202. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment 200, and further that any such media may contain computer-executable instructions for performing the methods of the present invention.

A number of program modules may be stored in the drives and RAM 212, including an operating system 230, one or more application programs 232, other program modules 234, and program data 236. The operating system 230 may be any suitable operating system or a combination of operating systems.

A user may enter commands and information into the computer 202 through one or more user input devices, such as a keyboard 238 and a pointing device (e.g., a mouse 240). Other input devices (not shown) may include a microphone, a joystick, a game pad, a satellite dish, a scanner, or the like. These and other input devices are often connected to the processing unit 204 through a serial port interface 242 that is coupled to the system bus 208, but may be connected by other interfaces, such as a parallel port, a game port or a universal serial bus (USB). A monitor 244 or other type of display device is also connected to the system bus 208 via an interface, such as a video adapter 246. In addition to the monitor 244, the computer 202 may include other peripheral output devices (not shown), such as speakers, printers, etc.

The computer 202 may operate in a networked environment using logical connections to one or more remote computers 260. The remote computer 260 may be a workstation, a server computer, a router, a peer device or other common network node, and typically includes many or all of the elements described relative to the computer 202, although, for purposes of brevity, only a memory storage device 262 is illustrated in FIG. 4. The logical connections depicted in FIG. 4 may include a local area network (LAN) 264 and a wide area network (WAN) 266. Such networking environments are commonplace in offices, enterprise-wide computer networks, intranets and the Internet.

When used in a LAN networking environment, the computer 102 is connected to the local network 264 through a network interface or adapter 268. When used in a WAN networking environment, the computer 202 typically includes a modem 270, or is connected to a communications server on the LAN, or has other means for establishing communications over the WAN 266, such as the Internet. The modem 270, which may be internal or external, is connected to the system bus 208 via the serial port interface 242. In a networked environment, program modules depicted relative to the computer 202, or portions thereof, may be stored in the remote memory storage device 262. It will be appreciated that the network connections shown are exemplary and other means of establishing a communications link between the computers 202 and 260 may be used.

In accordance with the practices of persons skilled in the art of computer programming, the present invention has been described with reference to acts and symbolic representations of operations that are performed by a computer, such as the computer 202 or remote computer 260, unless otherwise indicated. Such acts and operations are sometimes referred to as being computer-executed. It will be appreciated that the acts and symbolically represented operations include the manipulation by the processing unit 204 of electrical signals representing data bits which causes a resulting transformation or reduction of the electrical signal representation, and the maintenance of data bits at memory locations in the memory system (including the system memory 206, hard drive 214, floppy disks 218, CD-ROM 222, and shared storage system 210) to thereby reconfigure or otherwise alter the computer system's operation, as well as other processing of signals. The memory locations where such data bits are maintained are physical locations that have particular electrical, magnetic, or optical properties corresponding to the data bits.

Figure 5:
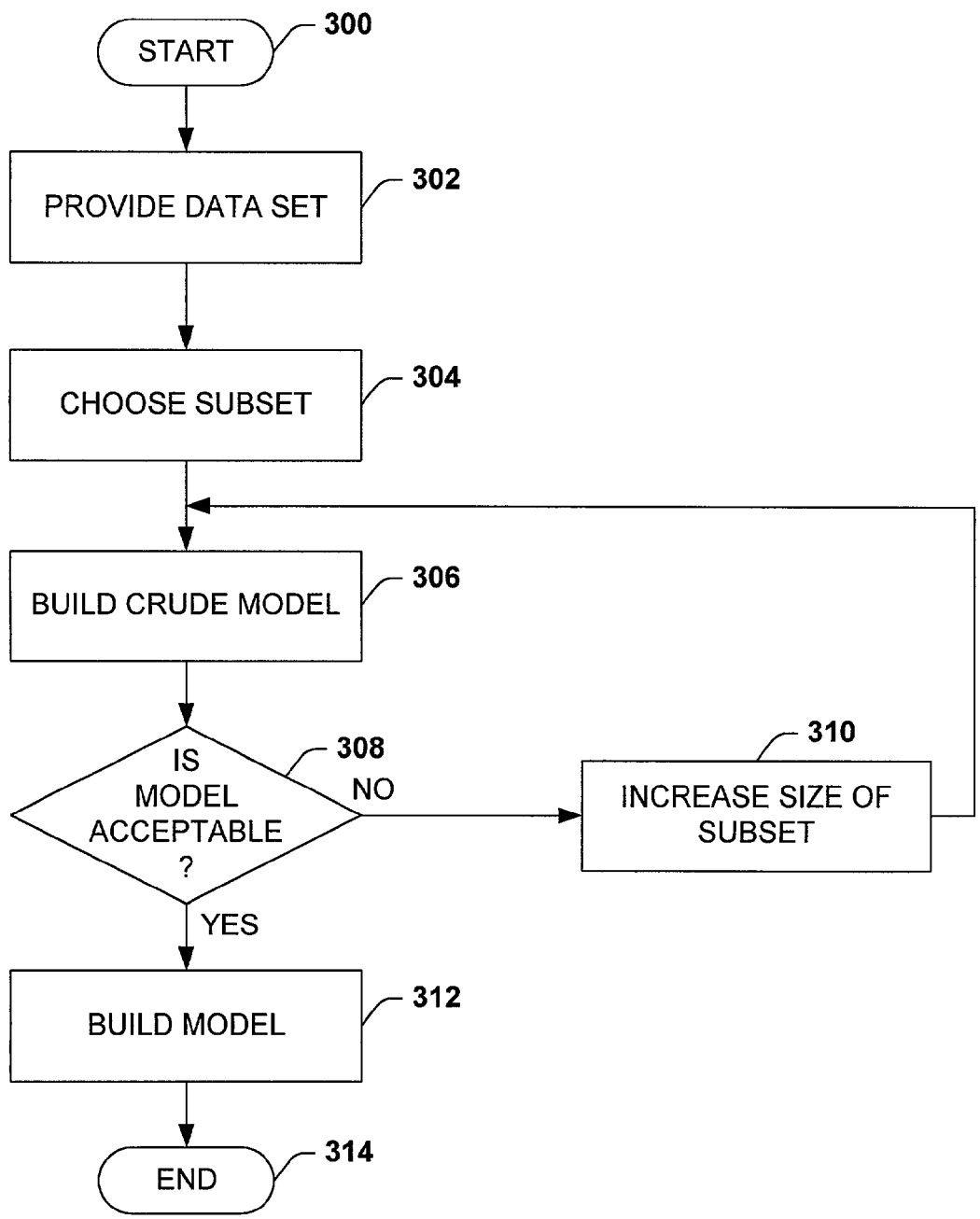
FIG. 5 is a flow diagram illustrating a methodology for determining a data set in accordance with the present invention.

In view of the foregoing structural and functional features described above, methodologies in accordance with various aspects of the present invention will be better appreciated with reference to FIG. 5. While, for purposes of simplicity of explanation, the methodology of FIG. 5 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. It is further to be appreciated that the following methodology may be implemented as computer-executable instructions, such as software stored in a computer-readable medium. Alternatively, the methodology may be implemented as hardware or a combination of hardware and software.

Referring to FIG. 5, the methodology begins at 300, in which parameters and variables are initialized to their starting values. Next at 302, a data set is provided. The data set, for example, has a plurality of records corresponding to one or more types of information that are to be modeled in accordance with an aspect of the present invention. The data set further may be divided into training data and holdout data.

The methodology then proceeds to 304 in which a subset of the data set is chosen. In particular, the subset is selected from available training data according to a defined data policy. The data policy may be a fixed policy or an adaptive policy. Next, at 306, a model is built for the subset of data provided at 304.

A training policy controls the applied training algorithm. For example, a crude version of an iterative training algorithm (e.g., an EM algorithm) may be employed to construct a model from the subset of data.

By way of illustration, the training policy may control the number of iterations for the iterative training algorithm. Thus, to expedite processing, the algorithm may be programmed to run a fixed number of one or more iterations. Alternatively, the training policy may set a convergence level for the training algorithm, which convergence level is selected to have a sufficiently high convergence threshold so as to reduce associated processing time.

Those skilled in the art will understand and appreciate that the training policy applied to build the model (306) may use the same random or predetermined parameter initialization for each subset of data considered. Alternatively, in accordance with an aspect of the present invention, parameter values $\theta(D_{n-1})$ obtained from a previous application of the parameterization process to a corresponding data set $D_{n-1}$ may be utilized to initialize the training algorithm for the next data set $D_n$. For a clustering model, however, the parameters associated with cluster weights may be set to be uniform for each application of the training algorithm. It is to be appreciated that some clusters may coalesce after the first iteration of the training algorithm due to a lack of data to support them. To alleviate premature cluster starvation, clusters that have coalesced may be identified and their respective cluster parameterization be reset to the initial random or predetermined cluster parameterization.

Referring back to FIG. 5, the methodology proceeds to 308 in which a determination is made as to whether the crude model constructed at 306 is acceptable. In particular, this may relate to whether the subset utilized to build the model at 306 is of a sufficient size. The quality of the model may be evaluated as a tradeoff between the expected incremental benefit and the expected incremental cost of additional training. For example, the benefit measurement may be determined as the relative improvement in log likelihood of the holdout set between most recent successive data sets with respect to the total improvement over a base model. The cost measurement could be the expected increment in time if training a model of high quality for the next data set and not the current data set. Alternatively or additionally, cost could be measured according to the added computational complexity according to the size of the data set. Those skilled in the art will understand and appreciate other ways to determine the acceptability of a crude model constructed in accordance with an aspect of the present invention.

If the determination at 308 is negative, the methodology proceeds to 310 in which the size of the subset is increased. As mentioned above, the amount of the increase is dependent upon the particular data policy being implemented. From 310, the methodology returns to 306 to build another model on the subset of data, which is the aggregate of the initial subset at 304 and the additional data added at 310. The new model is then evaluated at 308, as mentioned above. A loop formed of 306, 308, and 310 may repeat, thereby increasing the sample size (e.g., the number of data points) of the subset, until the subset of data is of a size for which an acceptable model can be built at 308.

After the acceptable subset of data is determined, the methodology may proceed to 312 in which a model is built for the subset of data determined to be acceptable. The model building at 312 may employ a training policy that emphasizes accuracy over efficiency more than the generally cruder version model building implemented at 306. For example, if both 306 and 312 employ iterative algorithms, the algorithm at 312 may perform more iterations or have a lower convergence level relative to the algorithm associated with 306. In this way, there is greater likelihood that the model generated at 312 is more accurate (e.g., a higher quality) than the model generated at 306. Moreover, by combining the more efficient model building of 306 to determine an appropriate sample size with the more accurate model building of 312, in accordance with an aspect of the present invention, the overall modeling process is facilitated. After an acceptable model is built at 312, the methodology ends at 314.

Figure 6:
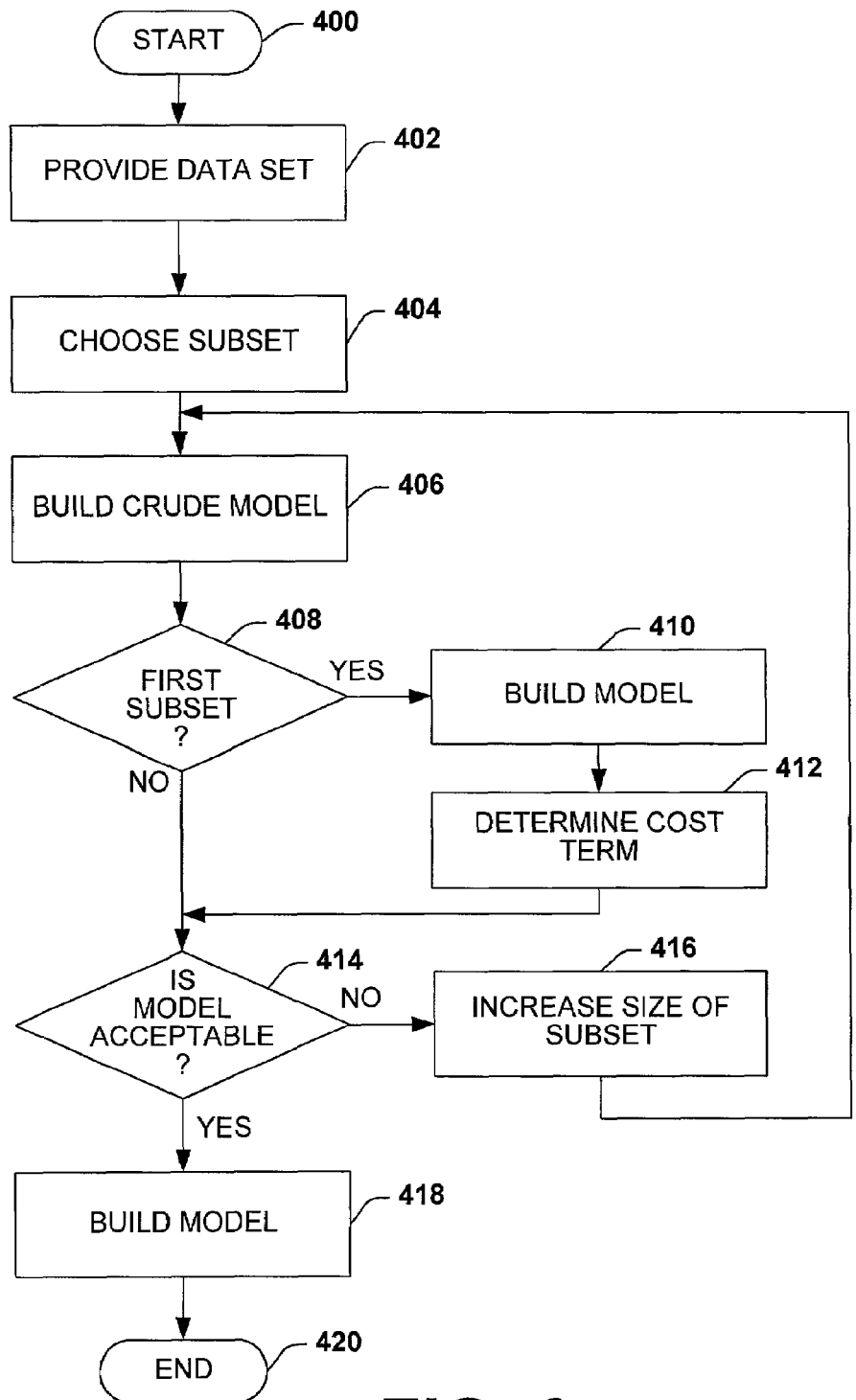
FIG. 6 is a flow diagram illustrating another methodology for determining a data set in accordance with the present invention.

FIG. 6 illustrates another methodology for efficiently building a model in accordance with an aspect of the present invention. Because several aspects of the methodology are substantially similar to those just described with respect to FIG. 5, a more detailed description of such aspects has been omitted for sake of brevity. The methodology begins at 400, in which parameters and variables are initialized to their starting values. Next at 402, a data set is provided. The data set further may be divided into training data and holdout data to facilitate model building (or parameter estimation) in accordance with an aspect of the present invention.

At 404 a first subset of the data set is chosen. For example, a data scheduler selects the initial data subset from available training data according to a defined data policy. The initial data subset is of small sample size relative to the data set and training data provided at 402. Any type of data policy may be employed to select the subset. Next, at 406, a crude model is built for the subset of data selected at 404. A training policy controls the applied training algorithm. As described herein, for example, a crude version of an iterative training algorithm (e.g., the EM algorithm) may be employed to construct the crude model. The model is considered to be crude because efficiency of model building takes priority over accuracy.

At 408, a determination is made as to whether the subset is the first subset of the training data. If the determination at 408 is affirmative, the methodology proceeds to 410 in which a model of higher quality is built for the first data subset. That is, the model building at 410 may employ a training policy that emphasizes accuracy over efficiency more than the generally cruder model building implemented at 406. From 410, the methodology proceeds to 412 in which cost term constants $c_1$, $c_2$, $c_3$, and $I_1$ of Eq. 3 are determined. It is to be appreciated that other cost terms could be utilized, such as may be functionally related to the time associated with incrementing the sample size and/or the increase in the sample size. The methodology proceeds to 414.

At 414, a determination is made as to whether the crude model constructed at 406 is acceptable. In particular, the determination may relate to whether the subset utilized to build the model at 406 is of a sufficient size. The quality of the model may be evaluated as a tradeoff between the expected incremental benefit and the expected incremental cost of additional training. For example, the benefit measurement may be determined as the relative improvement in log likelihood of the holdout set between most recent successive data sets with respect to the total improvement over a base model. The cost measurement could be the expected increment in time if training a model of high quality for the next data set and not the current data set. Alternatively or additionally, cost could be measured according to the added computational complexity according to the size of the data set, such as based on the cost term determined at 412. In accordance with a particular aspect, the acceptability may be defined by the stopping criteria set forth with respect to Eq. 4. Alternatively, an offset may be implemented relative to a benefit portion of a stopping criterion, such as set forth in Eq. 5. Those skilled in the art will understand and appreciate other stopping criteria that could be employed to determine acceptability of the model constructed at 406.

If the determination at 414 is negative, the methodology proceeds to 416 in which the size of the data subset is increased, such as based on a defined data policy (e.g., fixed, geometric, or adaptive). From 416, the methodology returns to 406 to build another model on the subset of data, which may be the aggregate of the initial subset at 404 and the additional data subset(s) added at 416. Because, the cost term constants have been defined based on the initial data subset, 410 and 412 are skipped and the methodology proceeds to 414 in which the acceptability of the new model is evaluated. After the initial data subset is run through the methodology, a loop formed of 406, 408, 414, and 416 may repeat, thereby increasing the sample size (e.g., the number of data points) of the subset, until the aggregate subset of data produces an acceptable model at 414 (See, e.g., Eqs. 4 and 5).

After the subset of data is determined to provide an acceptable model, the methodology may proceed to 418 in which a model is built for the subset of data determined to be acceptable. The model building at 418 may employ a training policy that emphasizes accuracy over efficiency more than the training policy employed at 406 and may be substantially identical to the model building implemented at 410. For example, if both 406, 410 and 418 employ iterative algorithms, the algorithm at 418 may perform more iterations or have a lower convergence level relative to the algorithm at 406. In this way, there is greater likelihood that the model generated at 418 is more accurate (e.g., a higher quality) than the model generated at 406. Accordingly, by combining the more efficient model building of 406 to determine an appropriate sample size with the more accurate model building of 418, in accordance with an aspect of the present invention, the overall modeling process is facilitated. After an acceptable model is built at 418, the methodology ends at 420.

Examples of the benefits from a system and/or method implemented in accordance with an aspect of the present invention are presented in *The Learning Curve Method Applied to Clustering*, Meek, C., Thiesson, B., & Heckerman, D., which was published in Jaakkola, T. & Richardson, T. (Eds.), Proceedings of the Eighth International Workshop on Artificial Intelligence and Statistics, pp. 85-91. Morgan Kaufmann Publishers, and in *The Learning Curve Method Applied to Clustering*, Meek, C., Thiesson, B., & Heckerman, D., Technical Report MSR-TR-2001-34, Microsoft Research (2001), both of which are incorporated herein by reference. Briefly stated, the paper investigates an efficient learning curve method in the context of learning a clustering model in accordance with the present invention. The paper further explores the computational performance gains and other benefits associated with applying the present invention to build models on actual data sets.

In view of the foregoing, the application of learning curve methods have been applied to the problem of identifying good clustering of data for a fixed number of clusters. Those skilled in the art will understand and appreciate that the teaching contained herein is equally applicable to identifying a good number of clusters, in accordance with an aspect of the present invention. In addition, various adaptive data policies as well as alternative stopping criteria may be utilized in conjunction with the approaches described herein without departing from the scope of the present invention.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A computer implemented system that facilitates building a statistical model for a computer readable data set, comprising:
   a first training method that efficiently builds a rough statistical model from a subset of the computer readable data set capable of statistical characterization;
   an evaluation component that evaluates the rough statistical model to determine whether the subset of the computer readable data set is an appropriate subset to be utilized to build a refined statistical model for the computer readable data set based at least in part on stopping criterion to facilitate reducing cost of clustering data relative to the computer readable data set;
   a second training method that builds the refined statistical model for the computer readable data set from the subset if the subset is deemed appropriate by the evaluation component, the refined statistical model provides a more accurate modeling of the subset than the rough statistical model and facilitates determining good clustering of data for a fixed number of clusters based at least in part on predefined accuracy criteria to facilitate clustering of data relative to the computer readable data set, wherein the clustered data is provided; and
   a data scheduler that, based at least in part on a data policy, adaptively controls the size of subsets for which the first training method is applied to facilitate building the refined statistical model.

2. The system of claim 1, the data scheduler increases the size of the subset to provide a larger aggregate subset of the data set if the rough statistical model is unacceptable, the first training method efficiently builds the rough statistical model for each larger aggregate subset of the data until the evaluation component determines the resulting rough statistical model to be acceptable.

3. The system of claim 2, the acceptability of each rough statistical model is determined based at least in part on a stopping criterion functionally related to an expected incremental benefit and a cost associated with increasing the size of the aggregate subset of the data set.

4. The system of claim 3, the cost of the stopping criterion is functionally related to at least one of time associated with evaluating an aggregate data subset of increased size or size of the aggregated subset of the data.

5. The system of claim 3, the stopping criterion is defined by $$\frac{\left(\frac{l(D_{HO}|\theta(D_n)) - l(D_{HO}|\theta(D_{n-1}))}{l(D_{HO}|\theta(D_n)) - l(D_{HO}|\theta_{BASE}(D_n))}\right)}{c_1(I_1 - \bar{J}_n)|\Delta D_{n+1}| + c_2(I_1 - \bar{J}_n) + c_1\bar{J}_n|D_{n+1}| + c_2\bar{J}_n + c_3} < \lambda$$

where
   $l(D_{HO}|\theta(D_n))$ is a log likelihood for holdout data evaluated for the model built by the first training method on a current subset of the training data set, $l(D_{HO}|\theta(D_{n-1}))$ is a log likelihood for holdout data evaluated for the model built by the first training method on a previous subset of the training data set, $l(D_{HO}|\theta_{base}(D_n))$ is a log likelihood for holdout data evaluated for a base model, $c_1$, $c_2$, and $c_3$ are constants determined based on application of the second training method relative to a first subset of the data set, $I_1$ is a number of iterations for the second training method, when applied to the first subset, $$\bar{J}_n = \frac{1}{n}\sum_{i=1}^{n} J_i,$$

and $J_i$ is the number of iterations for the first training method when applied to a data subset $D_i$, $|D_{n+1}|$ is the size of data set $D_{n+1}$, $|\Delta D_{n+1}|$ is the increment in size $|D_{n+1}|-|D_n|$, $\lambda$ is a user determined stopping threshold.

6. The system of claim 3, the stopping criterion is defined by $$\frac{\left(\frac{l(D_{HO}|\theta(D_n)) - l(D_{HO}|\theta(D_{n-1}))}{l(D_{HO}|\theta(D_n)) + \delta - l(D_{HO}|\theta_{BASE}(D_n))}\right)}{\dfrac{1}{c_1(I_1 - \bar{J}_n)|\Delta D_{n+1}| + c_2(I_1 - \bar{J}_n) + c_1\bar{J}_n|D_{n+1}| + c_2\bar{J}_n + c_3}} < \lambda$$

where $l(D_{HO}|\theta(D_n))$ is a log likelihood for holdout data evaluated for the model built by the first training method on a current subset of the training data set, $l(D_{HO}|\theta(D_{n-1}))$ is a log likelihood for holdout data evaluated for the model built by the first training method on a previous subset of the training data set, $l(D_{HO}|\theta_{base}(D_n))$ is a log likelihood for holdout data evaluated for a base model, $\delta$ is an offset associated with a difference in log likelihood for holdout data when evaluated for models built on a first subset of the training data set by the respective first and second training methods, $c_1$, $c_2$, and $c_3$ are constants determined based at least in part on application of the second training method relative to a first subset of the data set, $I_1$ is a number of iterations for the second training method, when applied to the first subset, $$\bar{J}_n = \frac{1}{n}\sum_{i=1}^{n} J_i,$$

and $J_i$ is the number of iterations for the first training method when applied to a data subset $D_i$, $|D_{n+1}|$ is the size of data set $D_{n+1}$, $|\Delta D_{n+1}|$ is the increment in size $|D_{n+1}|-D_n|$, and $\lambda$ is a user determined stopping threshold.

7. The system of claim 1, the first training method further comprises an iterative method, which builds the rough statistical model for the subset of the data set according to an associated training policy.

8. The system of claim 7, the first training method further comprises an associated training policy that defines parameter initialization of the first training method for each subset of the data set.

9. The system of claim 8, the training policy associated with the first training method further controls parameter initialization of the first training method, such that at least some of the parameters computed for a previous subset of the data are employed to initialize the first training method for a subsequent larger aggregate subset of the data.

10. The system of claim 8, the first training method is initialized by the same parameter values for each subset of the data subset.

11. The system of claim 8, the training policy sets the iterative method to perform a fixed number of at least one iteration.

12. The system of claim 11, the training policy sets the iterative method to perform a single iteration.

13. The system of claim 11, the second training method further comprises an iterative method that operates according to an associated training policy, so as to produce a more accurate statistical model for the appropriate subset of the data set than the first training method.

14. The system of claim 13, the iterative method associated with at least one of the first or second training methods is an Expectation and Maximization method.

15. The system of claim 7, the training policy associated with the iterative method of the first training method controls the iterative method to run until an associated convergence criterion is satisfied.

16. The system of claim 15, second training method further comprises an iterative method, which builds the refined statistical model for the appropriate subset of the data set according to an associated training policy.

17. The system of claim 16, the training policy associated with the iterative method of the second training method controls the respective iterative method to run until an associated convergence criterion is satisfied, the convergence criterion associated with the second training method provides improved model quality relative to the convergence criterion associated with the first training method.

18. A computer implemented system programmed to facilitate building a statistical model, comprising:

a first parameter estimation protocol that efficiently builds a rough statistical model from a subset of a computer readable data set based at least in part on a training policy associated therewith, the computer readable data set is statistically characterizable;

an evaluation component that determines whether the subset of data from which the rough statistical model was built is an acceptable size for building the statistical model to characterize the data set, the evaluation component utilizes a stopping criterion that is functionally related to an expected incremental benefit and an expected incremental cost associated with increasing the size of the subset of data to facilitate determining whether the rough statistical model is an acceptable size and to facilitate reducing cost of clustering data relative to the computer readable data set; and a second parameter estimation protocol that builds a refined statistical model for the data set from the subset if determined to have the acceptable size, the second parameter estimation protocol having an associated training policy, which enables the second parameter estimation protocol to build the refined statistical model to be a more accurate statistical model than the first parameter estimation protocol, the refined statistical model employed to identify clusters of data within the computer readable data set to facilitate clustering data relative to the computer readable data set, wherein the clustered data is provided.

19. The system of claim 18, further comprising a data scheduler that increases the size of the subset of the data set to provide a larger aggregate subset of the data set if the rough statistical model is unacceptable, the first parameter estimation protocol efficiently builds a rough statistical model for each larger aggregate subset until a resulting rough statistical model built therefrom is determined to be acceptable.

20. The system of claim 18, the first parameter estimation protocol further comprises an iterative protocol that builds the rough statistical model for each subset of the data set according to the associated training policy.

21. The system of claim 20, the training policy for the first parameter estimation protocol is operative to control parameter initialization for the first parameter estimation protocol, such that at least some of the parameters computed for a previous subset of the data are employed to initialize the first parameter estimation protocol for a subsequent larger aggregate subset of the data set.

22. The system of claim 20, the first parameter estimation protocol is initialized by the same parameter values for each subset of the data subset.

23. The system of claim 20, the training policy associated with first parameter estimation protocol controls the iterative protocol of the first parameter estimation protocol to perform a fixed number of at least one iteration, the second training protocol further comprising an iterative protocol, which is operative to perform a greater number of iterations than the iterative protocol of the first training protocol based at least in part on a training policy associated with the second parameter estimation protocol.

24. The system of claim 20, the training policy associated with the iterative protocol of the first parameter estimation protocol controls the iterative protocol to run until an associated convergence threshold is satisfied, the second training protocol further comprises an iterative protocol, the training policy associated with the iterative protocol of the second parameter estimation protocol being operative to control the respective iterative protocol to run until an associated convergence threshold is satisfied, the convergence threshold associated with the second parameter estimation protocol is less than the convergence threshold associated with the first parameter estimation algorithm protocol.

25. The system of claim 18, the cost of the stopping criterion is functionally related to at least one of time associated with evaluating the model for a larger subset of data or size of the larger subset of the data.

26. The system of claim 18, the stopping criterion is defined by $$\frac{\left(\frac{l(D_{HO}|\theta(D_n)) - l(D_{HO}|\theta(D_{n-1}))}{l(D_{HO}|\theta(D_n)) - l(D_{HO}|\theta_{BASE}(D_n))}\right)}{c_1(I_1 - \bar{J}_n)|\Delta D_{n+1}| + c_2(I_1 - \bar{J}_n) + c_1\bar{J}_n|D_{n+1}| + c_2\bar{J}_n + c_3} < \lambda$$

where $l(D_{HO}|\theta(D_n))$ is a log likelihood for holdout data evaluated for the model built by the first training protocol on a current subset of the training data set, $l(D_{HO}|\theta(D_{n-1}))$ is a log likelihood for holdout data evaluated for the model built by the first training protocol on a previous subset of the training data set, $l(D_{HO}|\theta_{base}(D_n))$ is a log likelihood for holdout data evaluated for a base model, $c_1$, $c_2$, and $c_3$ are constants determined based at least in part on application of the second parameter estimation protocol relative to a first subset of the data set, $I_1$ is a number of iterations for the second parameter estimation protocol, when applied to the first subset, $$\bar{J}_n = \frac{1}{n}\sum_{i=1}^{n} J_i,$$

and $J_i$ is the number of iterations for the first parameter estimation protocol when applied to a data subset $D_i$, $|D_{n+1}|$ is the size of data set $D_{n+1}$, $|\Delta D_{n-1}|$ is the increment in size $|D_{n+1}|-|D_n|$, and $\lambda$ is a user determined stopping threshold.

27. The system of claim 18, the stopping criterion is defined by $$\frac{\left(\frac{l(D_{HO}|\theta(D_n)) - l(D_{HO}|\theta(D_{n-1}))}{l(D_{HO}|\theta(D_n)) + \delta - l(D_{HO}|\theta_{BASE}(D_n))}\right)}{c_1(I_1 - \bar{J}_n)|\Delta D_{n+1}| + c_2(I_1 - \bar{J}_n) + c_1\bar{J}_n|D_{n+1}| + c_2\bar{J}_n + c_3} < \lambda$$

where $l(D_{HO}|\theta(D_n))$ is a log likelihood for holdout data evaluated for the model built by the first training protocol on a current subset of the training data set, $l(D_{HO}|\theta(D_{n-1}))$ is a log likelihood for holdout data evaluated for the model built by the first training protocol on a previous subset of the training data set, $l(D_{HO}|\theta_{base}(D_n))$ is a log likelihood for holdout data evaluated for a base model, $\delta$ is an offset associated with a difference in log likelihood for holdout data when evaluated for models built on a first subset of the training data set by the respective first and second training protocols, $c_1$, $c_2$, and $c_3$ are constants determined based at least in part on application of the second parameter estimation protocol relative to a first data subset of the data set, $I_1$ is a number of iterations for the second parameter estimation protocol, when applied to a first data subset, $$\bar{J}_n = \frac{1}{n}\sum_{i=1}^{n} J_i,$$

and $J_i$ is the number of iterations for the first parameter estimation protocol when applied to a data subset $D_i$, $|D_{n+1}|$ is the size of data set $D_{n+1}$,
$|\Delta D_{n+1}|$ is the increment in size $|D_{n+1}|-|D_n|$, and
$\lambda$ is a user determined stopping threshold.

28. A computer implemented learning curve method to facilitate building a statistical model, comprising:
choosing a subset of a computer readable data set that can be characterized statistically;
employing a first training method to build a rough statistical model to characterize the subset;
evaluating the rough statistical model for acceptability;
if the rough statistical model is unacceptable, repeatedly increasing the size of the subset of data to provide an aggregate data set, building another rough statistical model to characterize the aggregate subset, and reevaluating the other rough statistical model, the acceptability of each rough statistical model based at least in part on a stopping criterion functionally related to an expected incremental benefit and an expected incremental cost associated with increasing the size of the aggregate subset in order to facilitate reducing cost associated with clustering data relative to the computer readable data set; and
if the rough statistical model is acceptable, employing a second training method to build a refined statistical model based at least in part on the aggregate data set, the second training method being different from the first training method, the refined statistical model identifies data clusters contained in the computer readable data set to facilitate clustering of data relative to the computer readable data set, wherein the clustered data is provided.

29. The system of claim 28, the cost of the stopping criterion is functionally related to at least one of time associated with evaluating an aggregate data subset of increased size or size of the aggregate subset of the data.

30. The system of claim 28, the stopping criterion is defined by $$\frac{\left(\frac{l(D_{HO}|\theta(D_n))-l(D_{HO}|\theta(D_{n-1}))}{l(D_{HO}|\theta(D_n))-l(D_{HO}|\theta_{BASE}(D_n))}\right)}{c_1(I_1-\bar{J}_n)|\Delta D_{n+1}|+c_2(I_1-\bar{J}_n)+c_1\bar{J}_n|D_{n+1}|+c_2\bar{J}_n+c_3}<\lambda$$

where
$l(D_{HO}|\theta(D_n))$ is a log likelihood for holdout data evaluated for the model built by the first training method on a current subset of the training data set,
$l(D_{HO}|\theta(D_{n-1}))$ is a log likelihood for holdout data evaluated for the model built by the first training method on a previous subset of the training data set,
$l(D_{HO}|\theta_{base}(D_n))$ is a log likelihood for holdout data evaluated for a base model,
$c_1$, $c_2$, and $c_3$ are constants determined based at least in part on application of the second parameter estimation method relative to a first subset of the data set,
$I_1$ is a number of iterations for the second parameter estimation method, when applied to the first subset, $$\bar{J}_n=\frac{1}{n}\sum_{i=1}^{n}J_i,$$

and
$J_i$ is a number of iterations for the first parameter estimation method when applied to a data subset $D_i$,
$|D_{n+1}|$ is a size of data set $D_{n+1}$,
$|\Delta D_{n+1}|$ is an increment in size $|D_{n+1}|-|D_n|$, and
$\lambda$ is a user determined stopping threshold.

31. The system of claim 28, the stopping criterion is defined by $$\frac{\left(\frac{l(D_{HO}|\theta(D_n))-l(D_{HO}|\theta(D_{n-1}))}{l(D_{HO}|\theta(D_n))+\delta-l(D_{HO}|\theta_{BASE}(D_n))}\right)}{c_1(I_1-\bar{J}_n)|\Delta D_{n+1}|+c_2(I_1-\bar{J}_n)+c_1\bar{J}_n|D_{n+1}|+c_2\bar{J}_n+c_3}<\lambda$$

where
$l(D_{HO}|\theta(D_n))$ is a log likelihood for holdout data evaluated for the model built by the first training method on a current subset of the training data set,
$l(D_{HO}|\theta(D_{n-1}))$ is a log likelihood for holdout data evaluated for the model built by the first training method on a previous subset of the training data set,
$l(D_{HO}|\theta_{base}(D_n))$ is a log likelihood for holdout data evaluated for a base model,
$\delta$ is an offset associated with the difference in log likelihood for holdout data when evaluated for models built on a first subset of the training data set by the respective first and second training methods,
$c_1$, $c_2$, and $c_3$ are constants determined based at least in part on application of the second parameter estimation method relative to a first data subset of the data set,
$I_1$ is a number of iterations for the second parameter estimation method, when applied to a first data subset, $$\bar{J}_n=\frac{1}{n}\sum_{i=1}^{n}J_i,$$

and
$J_i$ is a number of iterations for the first parameter estimation method when applied to a data subset $D_i$,
$|D_{n+1}|$ is a size of data set $D_{n+1}$,
$|\Delta D_{n+1}|$ is an increment in size $|D_{n+1}|-|D_n|$, and
$\lambda$ is a user determined stopping threshold.

32. The method of claim 28, the first training method is more computationally efficient than the second training method.

33. The method of claim 28, each instance of model building repeated until obtaining an acceptable rough statistical model by the first training method employs more efficient and less accurate model building than model building employed by the second training method that occurs after obtaining the acceptable rough statistical model.

34. The method of claim 33, each instance of model building repeated until obtaining an acceptable rough statistical model employs the first training method as an iterative method that is run to a first convergence criterion, the second training method employing an iterative method that is run to a second convergence criterion, which demands more iterations than the first convergence criterion in order to obtain convergence, so that the refined statistical model is more accurate than the rough statistical model built by the first training method.

35. The method of claim 33, each instance of model building repeated until obtaining an acceptable rough statistical model employs an iterative method having a fixed number of at least one iteration, the second training method employing an iterative method having a greater number of iterations than the fixed number.

36. The method of claim 28, further comprising controlling parameter initialization employed in each instance of building a model for the aggregate data set prior to obtaining an acceptable rough statistical model.

37. The method of claim 36, further comprising initializing the first training method by the same parameter values for each subset.

38. The method of claim 36, the controlling further comprises reusing at least some of the parameters computed from a previous instance of model building to initialize a subsequent instance of model building for a subsequent larger aggregate data set prior to obtaining an acceptable rough statistical model.

39. A computer-readable medium having computer-executable instructions for:
choosing a subset of a computer readable data set;
building a rough statistical model to characterize the subset based at least in part on an associated training policy;
evaluating the rough statistical model for acceptability;
if the rough statistical model is unacceptable, repeatedly increasing the size of the subset of data to provide an aggregate data set, building a rough statistical model to characterize the aggregate subset based at least in part on an associated training policy, and reevaluating the rough statistical model;
building a refined statistical model for the computer readable data set from the aggregate data set if the rough statistical model is determined to be acceptable based at least in part on an associated training policy that includes determining acceptability based at least in part on an expected incremental benefit relative to an expected incremental cost associated with increasing the size of the aggregate data set in order to facilitate reducing cost associated with clustering data relative to the computer readable data set, the refined statistical model more accurately characterizes the aggregate data set; and
utilizing the refined statistical model to identify identifiable clusters in the computer readable data set to facilitate clustering data relative to the computer readable data set wherein the clustered data is provided.

40. A computer implemented method to facilitate constructing a statistical model, comprising:
separating computer readable data on a computer readable medium into holdout data set and training data set;
determining a data subset from the training data set by estimating statistical model parameters according to a first training policy and evaluating the estimated statistical model parameters relative to the holdout data set and repeating the estimation and evaluation of statistical model parameters with a larger subset of the training data set until an acceptable quality of the estimated statistical model is established to facilitate reducing cost associated with characterizing clusters relative to the computer readable data;
controlling parameter initialization employed in each estimation of statistical model parameters repeatedly until an acceptable size for the determined data subset is achieved; and
subsequent to establishing the acceptable quality of the estimated statistical model, using the determined data subset to improve the estimated statistical model parameters by employing a second training policy that is more accurate than the first training policy, the estimated model parameters obtained from employment of the second training policy utilized to characterize at least one cluster within the computer readable data to facilitate clustering data relative to the computer readable data, wherein the clustered data is provided.

41. The method of claim 40, each estimation of model parameters repeated until the acceptable quality of the estimated model is established further comprises employing an iterative method that is run until a first convergence criterion is satisfied, the estimation of model parameters using the determined data subset further comprising an iterative method that is run until a second convergence criterion is satisfied, which is operative to provide a better quality of model than the first convergence criterion.

42. The system of claim 41, the first convergence criterion causes the associated iterative method to run until a first convergence threshold is satisfied, the second convergence criterion causes the associated iterative method to run until a second convergence threshold is satisfied, the second convergence threshold being less than the first convergence threshold.

43. The method of claim 41, at least one of the iterative method run to the first convergence criterion or the iterative method run to the second convergence criterion is an Expectation and Maximization method.

44. The method of claim 40, each estimation of model parameters repeated until the acceptable quality of the estimated model is established employs an iterative method having a fixed number of at least one iteration, the estimation of model parameters using the determined data subset further employing an iterative method having a greater number of iterations than the fixed number.

45. The method of claim 40, the controlling further comprises reusing at least some of the parameters computed from a previous estimation of model parameters to initialize a subsequent estimation of model parameters for a next larger subset of the training set.

46. The method of claim 40, each estimation of model parameters repeated until the acceptable quality of the estimated model is established further comprises initializing the first training method by the same parameter values.

47. The method of claim 40, further comprising determining the acceptability of the estimated model based at least in part on an expected incremental benefit relative to a cost associated with increasing the size of the subset of the data set.

48. A computer-readable medium having computer-executable instructions for:
separating computer readable data into a holdout data set and a training data set, the computer readable data is statistically characterizable;
determining a data subset from the training data set by estimating model parameters and controlling model parameter initialization according to a first training policy and evaluating the estimated model parameters relative to the holdout data set and repeating the estimation, initialization, and evaluation of model parameters with a next successively larger subset of the training data set until an acceptable quality of the estimated model is established to facilitate reducing cost associated with clustering data relative to the computer readable data;

subsequent to establishing the acceptable quality of the estimated model, using the determined data subset to improve the estimated model parameters by employing a second training policy that is more accurate than the first training policy; and utilizing the estimated model parameters determined by utilization of the second training policy to identify a cluster in the computer readable data to facilitate clustering data relative to the computer readable data, wherein the clustered data is provided.

49. A computer implemented method to facilitate constructing a statistical model, comprising:

separating computer readable data into a holdout data set and a training data set, the computer readable data is statistically characterizable;

iteratively estimating statistical model parameters for a subset of the training data set over a fixed number of iterations and evaluating the estimated statistical model parameters relative to the holdout data set;

repeating the estimation and evaluation of statistical model parameters obtained with successively larger subsets of the training data set until an acceptable model quality is established, acceptable model quality determined based at least in part on an expected incremental benefit relative to an expected incremental detriment associated with an increase in size of each larger training subset of the data set in order to facilitate reducing cost associated with clustering data relative to the computer readable data;

after the acceptable model quality is established, iteratively estimating statistical model parameters for the data subset, which provided the acceptable model quality, until a better quality of model is provided relative to a preceding estimation performed over the fixed number of iterations; and using the better quality model relative to the computer readable data to identify at least a cluster of data within the computer readable data to facilitate clustering data relative to the computer readable data, wherein the at least a cluster of data is provided.

50. The method of claim 49, at least one of the iterative estimations employs an Expectation and Maximization method.

51. The method of claim 49, the estimation that occurs after the acceptable model quality is established, further comprises employing an iterative method having a greater number of iterations than the fixed number.

52. The method of claim 49, the estimation of model parameters after the acceptable model quality has been established further comprises employing an iterative method that is run until a convergence criterion is satisfied, which is operative to provide a better quality of model with the data subset than a preceding estimation employing the fixed number of iterations.

53. The method of claim 49, further comprising controlling parameter initialization for each estimation of model parameters that occurs before the acceptable model quality has been established.

54. The method of claim 53, each iterative estimation until the acceptable model quality is established further comprises initializing the first training method by the same parameter values.

55. The method of claim 53, the controlling further comprises reusing at least some of the parameters obtained in a previous estimation of model parameters to initialize a subsequent estimation of model parameters for a next larger subset of the training data set.

56. A computer implemented method to facilitate constructing a statistical model, comprising:

separating computer readable data into a holdout data set and a training data set, the computer readable data is statistically characterizable;

iteratively estimating statistical model parameters for a subset of the training data set until a first convergence threshold is satisfied and evaluating the estimated statistical model parameters relative to the holdout data set;

repeating the estimation and evaluation of statistical model parameters obtained with successively larger subsets of the training data set until determining a size of data subset that provides acceptable statistical model parameters, acceptable statistical model parameters attained where the expected marginal cost outweighs the expected marginal benefit associated with successively larger subsets in order to facilitate reducing cost associated with clustering data relative to the computer readable data;

after determining the size of data subset that provides acceptable statistical model parameters, iteratively estimating statistical model parameters for a data subset of the acceptable size until a second convergence threshold is satisfied, the second convergence threshold being less than the first convergence threshold; and based at least in part on the estimated statistical model parameters identified at the second convergence threshold, identifying a good clustering data relative to the computer readable data to facilitate clustering data, wherein the clustered data is provided.

57. A computer implemented system to facilitate building a statistical model for a computer readable data set, comprising:

first means for building a rough statistical model to characterize a subset of the computer readable data set;

means for evaluating the acceptability of the rough statistical model based at least in part on an expectational cost-benefit analysis to facilitate reducing cost associated with clustering data relative to the computer readable data set, the first means building another rough statistical model for a larger subset of the data set if the evaluation means determines that a prior rough statistical model is unacceptable;

second means, which is different from the first means, for building a refined statistical model from an aggregate subset of data that yielded the rough statistical model deemed acceptable by the evaluation means; and means for identifying a cluster of data within the computer readable data set based at least in part on the refined statistical model to facilitate clustering data relative to the computer readable data set, wherein the clustered data is provided.

58. A computer implemented system to facilitate building a statistical model for a computer readable data set, comprising:

first means for estimating statistical model parameters from a subset of the computer readable data set, the data set is statistically characterizable;

means for evaluating the estimated statistical model parameters relative to a holdout data set of the data set;

means for determining a data subset from the training data set by causing the first means and the means for evaluating to respectively repeat estimation and evaluation of statistical model parameters with a next successively larger subset of the training data set until an acceptable quality of the statistical model parameters is established, the quality of the statistical model parameters established when the expected cost of generating the next successively larger subset outweighs the expected benefit in accuracy of utilizing the next successively larger subset in order to facilitate reducing cost associated with clustering data relative to the computer readable data set;
second means for estimating statistical model parameters based at least in part on the determined data subset to provide a more accurate estimation of model parameters than the first means;

means for setting parameters associated with cluster weights of a cluster of data; and
means for determining the cluster of data contained in the computer readable data set based at least in part on the more accurate estimation of statistical model parameters to facilitate clustering data relative to the computer readable data set, wherein the clustered data is provided.

* * * * *

UNITED STATES PATENT AND TRADEMARK OFFICE
CERTIFICATE OF CORRECTION

| | | |
|---|---|---|
| PATENT NO. | : 7,409,371 B1 | Page 1 of 1 |
| APPLICATION NO. | : 09/873719 | |
| DATED | : August 5, 2008 | |
| INVENTOR(S) | : David E. Heckerman et al. | |

It is certified that error appears in the above-identified patent and that said Letters Patent is hereby corrected as shown below:

In column 15, line 66, in Claim 6, delete "$|D_{n+1}|\text{-}D_n|$," and insert -- $|D_{n+1}| - |D_n|$, --, therefor.

In column 17, line 50, in Claim 24, before "protocol." delete "algorithm".

In column 21, line 49, in Claim 39, delete "set" and insert -- set, --, therefor.

Signed and Sealed this
Twenty-fourth Day of May, 2011

David J. Kappos
*Director of the United States Patent and Trademark Office*